(12) United States Patent
Cordeiro et al.

(10) Patent No.: US 8,379,664 B2
(45) Date of Patent: Feb. 19, 2013

(54) METHOD AND APPARATUS FOR DYNAMIC BANDWIDTH MANAGEMENT

(75) Inventors: Carlos Cordeiro, Portland, OR (US); Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 397 days.

(21) Appl. No.: 12/418,630

(22) Filed: Apr. 6, 2009

(65) Prior Publication Data
US 2010/0254404 A1    Oct. 7, 2010

(51) Int. Cl.
*H04L 12/43*    (2006.01)
(52) U.S. Cl. ........................................... 370/461
(58) Field of Classification Search .............. 370/328, 370/329, 458, 337, 336, 443; 455/562.1, 455/450; 715/740
See application file for complete search history.

(56) References Cited

U.S. PATENT DOCUMENTS

| | | | |
|---|---|---|---|
| 7,684,428 B2 * | 3/2010 | Habetha et al. ............... | 370/443 |
| 2004/0072573 A1 * | 4/2004 | Shvodian ...................... | 455/450 |
| 2004/0156312 A1 | 8/2004 | Salonidis et al. | |
| 2007/0019666 A1 * | 1/2007 | Hirano et al. ................. | 370/458 |
| 2007/0253391 A1 | 11/2007 | Shao et al. | |
| 2007/0286140 A1 | 12/2007 | Kwon | |
| 2008/0198829 A1 | 8/2008 | Cheng et al. | |
| 2009/0034491 A1 * | 2/2009 | Adams et al. ................. | 370/337 |
| 2009/0040984 A1 * | 2/2009 | Rajamani ...................... | 370/336 |
| 2009/0067389 A1 * | 3/2009 | Lee et al. ...................... | 370/336 |
| 2010/0014463 A1 * | 1/2010 | Nagai et al. ................... | 370/328 |
| 2010/0016023 A1 * | 1/2010 | Yamauchi et al. .......... | 455/562.1 |
| 2010/0083127 A1 * | 4/2010 | Rofougaran .................. | 715/740 |
| 2010/0118802 A1 * | 5/2010 | Lakkis et al. ................. | 370/329 |
| 2010/0272054 A1 * | 10/2010 | Tatsuta et al. ................. | 370/329 |

OTHER PUBLICATIONS

Office Action Received for Chinese Patent Application No. 201010162651.2, Mailed on Jun. 14, 2012, 21 pages of Office Action including 13 pages of English translation.
International Search Report of PCT Application PCT/US2010/026600, mailed Oct. 26, 2010.
International Preliminary Report on Patentability for PCT application PCT/US2010/026600, mailed on Oct. 20, 2011.

* cited by examiner

*Primary Examiner* — Andrew Lai
*Assistant Examiner* — Syed M Bokhari
(74) *Attorney, Agent, or Firm* — Shichrur & Co.

(57) ABSTRACT

A wireless communication device, a wireless communication system and a method of allocating a time slot during peer to peer communication over a millimeter wave wireless channel. The allocation of the time slot is done by truncating a channel time allocated time slot and releasing a truncated channel time allocation time slot for communication without a piconet network controller intervention and dynamically allocating a contention access period utilizing the released channel time of the allocated time.

23 Claims, 3 Drawing Sheets

US 8,379,664 B2

METHOD AND APPARATUS FOR DYNAMIC BANDWIDTH MANAGEMENT

BACKGROUND OF THE INVENTION

A personal wireless area network (WPAN) is a network used for communication among computing devices (for example, telephones and personal digital assistants) close to one person. The devices may or may not belong to the person in question. The reach of a WPAN may be a few meters. WPANs may be used for interpersonal communication among the personal devices themselves, or for connecting via an uplink to a higher level network and for example the Internet.

The IEEE 802.15.3 Task Group 3c (TG3c) was formed in March 2005. TG3c is developing a millimeter-wave (mmWawe) based alternative physical layer (PPHY) for the existing 802.15.3 Wireless Personal Area Network (WPAN) Standard e.g., IEEE 802.15.3-2003. This mmWave WPAN may operate in a band including 57-64 GHz unlicensed band defined by FCC 47 CFR 15.255. The millimeter-wave WPAN may allow very high data rate over 2 Gigabit per second (Gbps) applications such as high speed Internet access, streaming content download (e.g., video on demand, high-definition television (HDTV), home theater, etc.), real time streaming and wireless data bus for cable replacement.

However, a mmWave communication link is significantly less robust than those at lower frequencies (e.g. 2.4 GHz and 5 GHz bands) due to both oxygen absorption and high attenuation through obstructions. In addition, the mmWave communication link may use a directional antenna and/or antennas array to increase the communication range. The use of a directional antenna makes a link very sensitive to mobility. For example, a slight change in the orientation of the device or the movement of a nearby object and/or person may disrupt the link.

Applications for mmWave frequencies are expected to enjoy variable bit rate (VBR) type of traffic, for example, compressed wireless display, certain external input/output (I/O), and Internet type of traffic and the like. The methods that are used for bandwidth management include using a network coordinator or controller (e.g., piconet coordinator (PNC)) which cause to increased power consumption of the devices and PNC.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
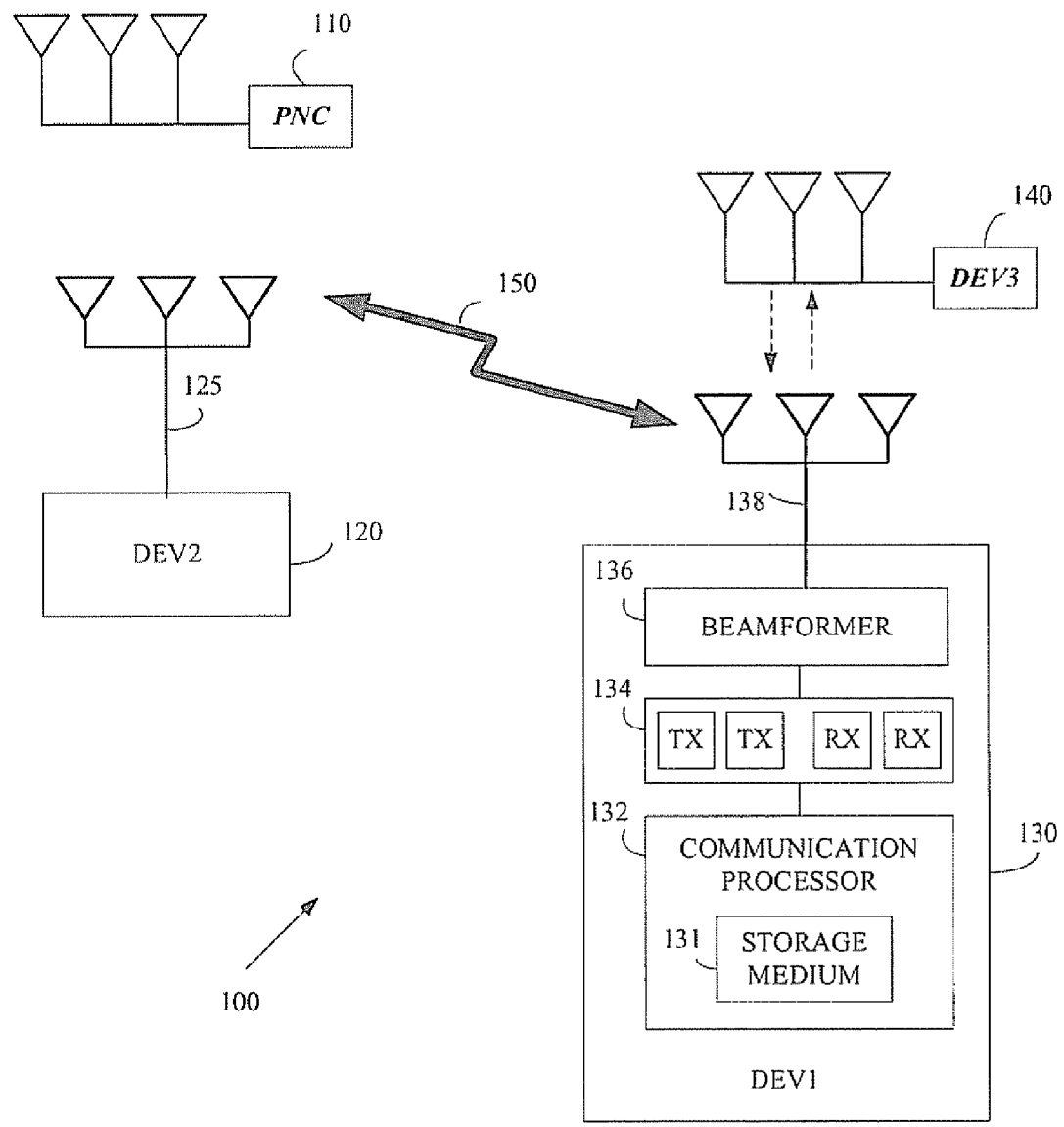
FIG. 1 is a schematic illustration of a wireless communication network according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill ill the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be tie techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more then one. The term plurality, as used herein, is defined as two, or more than two. The term another, as used herein is defined as at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN), and the like.

Types of WPAN stations intended to be within the scope of the present invention include, although are not limited to, mobile stations, access points, stations for receiving and transmitting spread spectrum signals such as, for example, Frequency flopping Spread Spectrum (FISS), Direct Sequence Spread Spectrum (DSSS) millimeter-wave (mmWawe) based alternative physical layer (PHY) for the existing 802.15.3 Wireless Personal Area Network (WPAN) Standard 802.15.3-2003.

According to this exemplary embodiment of the invention, WPAN 100 may include a piconet coordinator or controller (PNC) 110 and stations 120, 130 and 140. Stations 120, 130 140 are depicted as wireless communication device 1 (DEV1), DEV2 and DEV3, respectively. PNC 110 may include a network computer, a laptop computer or the like.

Stations 120, 130 and 140 may include a camera, a mouse, an earphone, a speaker, a display, a mobile personal device or the like.

According to this exemplary embodiment of the invention, DEV1 130 may include a communication processor 132 including a computer readable storage medium 131, a transceiver 134, a beamformer 136 and plurality of antennas 138 operably coupled to beamformer 136.

Although the scope of the present invention is not limited in this respect, for example and according to one of the embodiments of the invention, a piconet (e.g., WPAN 100) may include PNC 110 and several slave devices, for example DEVs 120, 130 and 140 within the transmission range of PNC 110. Any of DEVs 130 and 140 may include a similar architecture as DEV1 120 and may operate as a PNC, if desired.

According to at least one embodiment of the invention, PNC 110 may provide a basic timing by broadcasting for example beacon packets. Beacons may be used to set the timing allocation and management information for the piconet. The beacons may include a channel time allocation (CTA) for stations 120, 130 and/or 140 for communication. Stations 120, 130 and 140 may synchronize themselves with PNC 110 and/or to each other according to the information in the received beacons if desired.

Furthermore, according to embodiments of the invention PNC 110 and/or each of stations 120, 130 and 140 may truncate and/or extend a contention access period (CAP) by using CTA truncation and CTA extension messages. For example, the CTA truncation may allow a DEV to release any unused portion of a CTA to be used by all other devices in the piconet after all transmissions are over, provided there is still channel time available in the current CTA. The CTA truncation message may be transmitted during the CTA which is to be truncated, if desired. The CTA extension message may allow a DEV to request more channel time following the current CTA, provided there is unallocated channel time available following the current CTA. A CTA extension message may be transmitted during the CTA which is to be extended, although it should be understood that the scope of the present invention is not limited in this respect.

According to exemplary embodiment of the invention, station 130 may include a communication processor 132 to allocate a time slot for transmitting and receiving a signal over a wireless channel for example, wireless channel 150. For example communication processor 132 may include and/or operably coupled to computer readable storage medium 131. Computer readable storage medium 131 may include instructions to be executed by communication processor 132 in order to truncate, extend, and release the CAP and/or the CTA. For example, computer readable storage medium 131 may include a nonvolatile memory such as, for example a read only memory (ROM), volatile memory such as, for example random access memory (RAM), FLASH or the like.

The Communication processor 132 may truncate the allocated time slot and/or may release a channel time for communication. Furthermore, communication processor 132 may dynamically allocate a CAP by utilizing the released channel time of the allocated time slot. According to one exemplary embodiment of the invention communication processor 132 may be designed to operate in the mmWave frequency band e.g., 60 GHz, although the scope of the present invention is not limited in this respect. Communication processor 132 may also extend the CTA, if desired.

One exemplary embodiment of station 130 may include a transceiver 134. According to this example, transceiver 134 may include one or more receivers (RX) and one or more transmitters (TX) that may operably couple to a beamformer 136. Transceiver 134 may be operably coupled to communication processor 132 and may transmit and/or receive commands and messages for truncating the channel time allocated time slot. Transceiver 134 may transmit and/or receive commands and/or messages for allocating the CAP by using for example a peer to peer communication scheme over a millimeter-wave frequency band. For example, the peer to peer communication scheme may include a random access communication scheme, a Carrier Sense Multiple Access With Collision Avoidance (CSMA/CA) communication scheme or the like.

Stations 120, 130, 140 and PNC 110, may include a beamformer 136 that operably coupled to two or more antennas 138. Beamformer 136 may form a beam that points directly to a receiving device (e.g. station 120). For example, beamformer 136 together with transceiver 134 mad antennas 138 may form a multiple-input-multiple-output (MIMO) transmitters-receivers system that may generate antenna beams aimed to one of the stations and/or the PNC, if desired.

The two or more antennas 138 may include at least one omni-directional antenna to receive the allocated contention access period (CAP) and plurality of directional antennas, if desired. For example, the antennas may include a dipole antenna and/or other desired type of antennas, although the scope of the present invention is not limited in this respect.

It should be understood that according to embodiment of the present invention, PNC 110 and stations 120, 130 and 140 may employ similar architecture of hardware and software. Communication processor 132, transceiver 134 and beamformer 136 may be implemented by hardware, by software and/or any combination of hardware and software.

Figure 2:
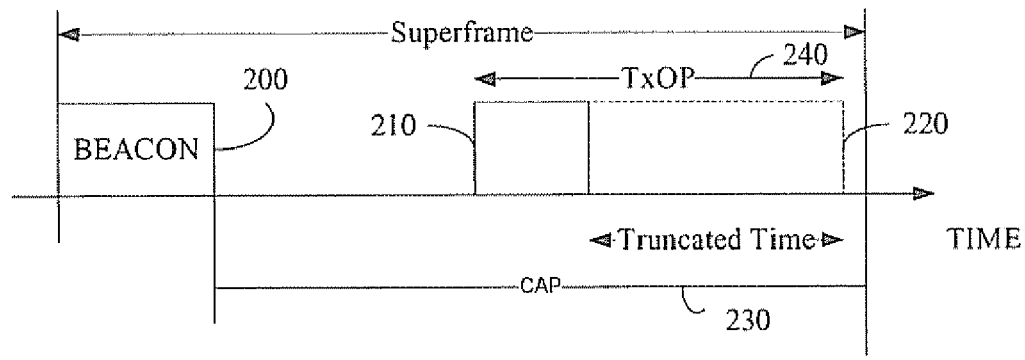
FIG. 2 is a schematic illustration of a superframe according to exemplary embodiment of the invention.
Figure 3:
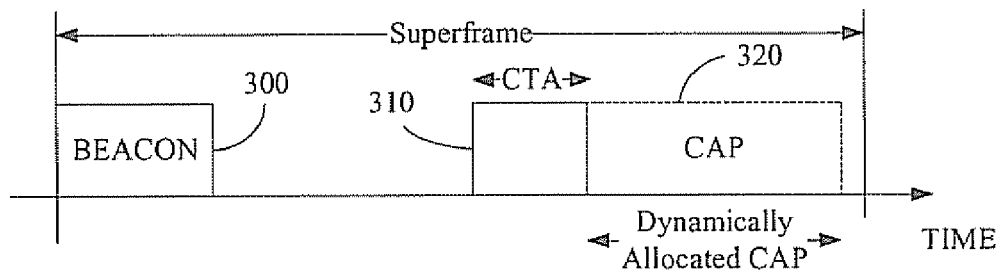
FIG. 3 is a schematic illustration of a superframe according to exemplary embodiment of the invention and FIG. 4 is a flow chart of a method of bandwidth allocation according to some embodiments of the invention.

Turning to FIGS. 2 and 3, illustrations of a time slot of a superframe according to exemplary embodiments of the present invention is shown. The superframe of FIGS. 2 and 3 may include three major parts: a beacon (e.g., beacon 200 of FIG. 2 and beacon 300 of FIG. 3), a Contention Access Period (CAP) (e.g. CAP 230 of FIG. 2, CAP 320 of FIG. 3) and the CTA, for example CTA 210 of FIG. 2 and CTA 110 of FIG. 3.

According to embodiments of the invention the CAP may be used for asynchronous data or communication commands. For example, a medium access mechanism during the CAP may be Carrier Sense Multiple Access/Collision Avoidance (CSMA/CA). The CTAs may be used for commands, isochronous streams, asynchronous data and the like. Collision-free transmissions may be guaranteed in CTAs, although the scope of the present invention is not limited in this respect.

Turning first to FIG. 2, in this example, stations 120 and 130 may establish a peer to peer communication during a transmission opportunity (TxOP) 240 of each station. Since stations 120 and 130 may not utilize the entire TxOP 240 for communication, TxOP 240 may be truncated. For example, CTA 210 is the time that the stations used for communication and a truncated time 220 shown with a doted line is the time that the stations may release for use of the other stations, if desired.

According to exemplary embodiment of the invention, truncated time 220 may be released by station 120 and station 130 to station 140 for communication without PNC 110 intervention. Acceding to this example, stations 120 and station 130 may directly release truncated time 220 to station 140 without PNC 110 intervention and may allow station 140 to reuse the remaining CTA time (e.g., truncated time 220) for its own communication, if desired. This may save power at PNC 110 and may allow a greater level of spatial reuse at PNC 110 although the scope of the present invention is not limited in this respect.

Turning to FIG. 3 a dynamic allocation of CAP 320 is shown. Once station 120 and station 130 truncate CTA 210 a CAP (e.g., CAP 320) may be dynamically allocated by broadcasting a CAP Start command to all DEVs for example station 120, 130 and 140 of the wireless network. Once CAP 320 has been dynamically allocated stations 120, 130 and 140 may access the wireless medium through a prescribed random access scheme for example, CSMA/CA. This may remove the need for any scheduling, may improve the channel efficiency, and may make the piconet system of PNC 110 and stations 120, 130 and 140 more scalable.

In another embodiment of the invention and in addition to dynamically allocating of CAP 320, PNC 110 may dynamically truncate/extend a CAP. For example, by following the access rules of the CSMA/CA access scheme, PNC 110 may access the wireless medium and send a CAP Truncation or CAP Extension message to truncate or extend, respectively, the length of CAP 320, although the scope of the present invention is not limited in this respect.

Figure 4:
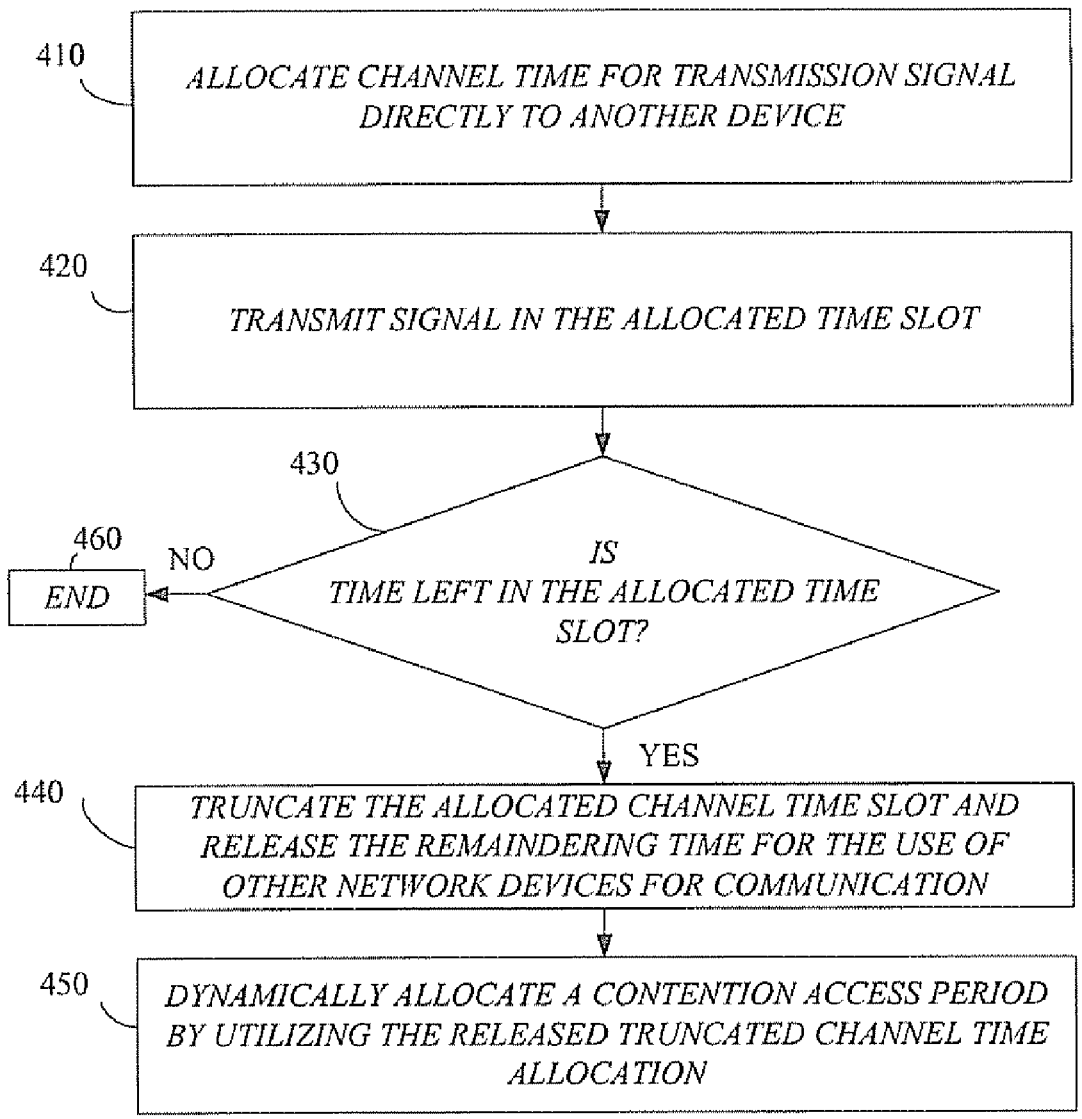

Turning to FIG. 4 a flow chart of a method of bandwidth allocation according to some embodiments of the invention is shown. According to an exemplary embodiment of the invention stations 120 and 130 may use a peer to peer communication over a millimeter wave wireless channel to allocate a channel time from transmission directly to another device with PNC 110 intervention (text block 410). Stations 120 and 130 may transmit a signal in the allocated time slot e.g., TxOP (text block 420). If stations 120 and 130 do not utilize the all TxOP (diamond 430) truncation of CTA and release of the truncated CTA for the use of other network devices without PNC intervention may be performed (text block 440) otherwise the method may end (text box 460).

According to this example, stations 120 and 130 may transmit and receive commands for truncating the allocated time slot. Furthermore, stations 120 and 130 may transmit and receive commands for allocating the contention access period by using a peer to peer communication scheme over a millimeter-wave frequency band and may dynamically allocate a contention access period by utilizing the released truncated channel (text block 450), if desired.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
allocating a time slot for peer to peer communication over a millimeter wave wireless channel between a first station and a second station;
truncating the allocated time slot using a channel time allocation truncation message and releasing a truncated time of the allocated time slot for a use for communication by at least a third station wherein the releasing of the truncated time is done without an intervention of a piconet network controller; and
dynamically allocating a contention access period (CAP) utilizing the released truncated time for the allocated CAP.

2. The method of claim 1, comprising:
transmitting and receiving commands for truncating the allocated time slot and for allocating the contention access period by using a peer to peer communication scheme over a millimeter-wave frequency band.

3. The method of claim 2, wherein using the peer to peer communication scheme comprises using a random access communication scheme.

4. A wireless communication device comprising:
a communication processor to allocate a time slot for transmitting and receiving a signal over a wireless channel from a first station, to truncate the allocated time slot using a channel time allocation truncation message, to release a truncated time of the allocated time slot for a use for communication by at least a second station wherein the release of the truncated time is done without a piconet network controller intervention and to dynamically allocate a contention access period (CAP) by utilizing the released truncated time for the allocated CAP.

5. The wireless communication device of claim 4, comprising:
a transceiver operably coupled to the communication processor to transmit and receive commands for truncating the allocated time slot and for allocating the contention access period (CAP) by using a peer to peer communication scheme over a millimeter-wave frequency band.

6. The wireless communication device of claim 5, wherein the peer to peer communication scheme comprises a random access communication scheme.

7. The wireless communication device of claim 5, wherein the peer to peer communication scheme comprises a Carrier Sense Multiple Access With Collision Avoidance (CSMA/CA) communication scheme.

8. The wireless communication device of claim 4, comprising:
a beamformer operably coupled to two or more antennas to form a beam directly to a receiving device.

9. The wireless communication device of claim 8, wherein one of the two or more antennas is an omni-directional antenna to receive the allocated contention access period.

10. A wireless communication system comprising two or more stations, wherein a station comprises:
a communication processor to allocate a time slot for transmitting and receiving a signal over a wireless channel from a first station, to truncate the allocated time slot using a channel time allocation truncation message, to release a truncated time of the allocated time slot for a use for communication by at least a second station wherein the release of the truncated time is done without a piconet network controller intervention and to dynamically allocate a contention access period (CAP) by utilizing the released truncated time for the allocated CAP.

11. The wireless communication system of claim 10, wherein a station comprises:
a transceiver operably coupled to the communication processor to transmit and receive commands for truncating the allocated time slot and for allocating the contention access period (CAP) by using a peer to peer communication scheme over a millimeter-wave frequency band.

12. The wireless communication system of claim 11, wherein the peer to peer communication scheme comprises a random access communication scheme.

13. The wireless communication system of claim 11, wherein the peer to peer communication scheme comprises a Carrier Sense Multiple Access With Collision Avoidance (CSMA/CA) communication scheme.

14. The wireless communication system of claim 10, wherein the station comprises:
a beamformer operably coupled to two or more antennas to form a beam directly to a receiving device.

15. The wireless communication system of claim 14, wherein one of the two or more antennas is an omni-directional antenna to receive the allocated contention access period.

16. A wireless communication device comprising:
a communication processor to allocate a time slot for transmitting and receiving a signal over a wireless channel from a first station, to truncate the allocated time slot using a channel time allocation truncation message, to release a truncated time of the allocated time slot for a use for communication by at least a second station wherein the release of the truncated time is done without a piconet network controller intervention and to dynamically allocate a contention access period (CAP) by utilizing the released truncated time for the allocated CAP; and
a beamformer operably coupled to two or more dipole antennas to form a beam directly to a receiving device.

17. The wireless communication device of claim 16, wherein one of the two or more antennas is an omni-directional antenna to receive the allocated contention access period.

18. The wireless communication device of claim 16, comprising:
a transceiver operably coupled to the communication processor to transmit and receive commands for truncating the allocated time slot and for allocating the contention access period (CAP) by using a peer to peer communication scheme over a millimeter-wave frequency band.

19. The wireless communication device of claim 18, wherein the peer to peer communication scheme comprises a random access communication scheme.

20. The wireless communication device of claim 18, wherein the peer to peer communication scheme comprises a Carrier Sense Multiple Access With Collision Avoidance (CSMA/CA) communication scheme.

21. A processor comprising:
a non-transitory computer readable storage medium, having stored thereon instructions, that when executed, result in:
allocating a time slot for peer to peer communication over a millimeter wave wireless channel between a first station and a second station;
truncating the allocated time slot using a channel time allocation truncation message and releasing a truncated time of the allocated time slot for a use for communication by at least a third station wherein the releasing of the truncated time is done without a piconet network controller intervention; and
dynamically allocating a contention access period (CAP) utilizing the released time of the truncated time for the allocated CAP.

22. The processor of claim 21, wherein the instructions when executed result in:
transmitting and receiving commands for truncating the allocated time slot and for allocating the contention access period by using a peer to peer communication scheme over a millimeter-wave frequency band.

23. The processor of claim 22, wherein the instructions when executed result in:
using a random access communication scheme when performing peer to peer communication.

* * * * *